(12) United States Patent
Wang et al.

(10) Patent No.: US 12,072,569 B2
(45) Date of Patent: Aug. 27, 2024

(54) DISPLAY PANEL AND DISPLAY DEVICE

(71) Applicant: Shenzhen China Star Optoelectronics Semiconductor Display Technology Co., Ltd., Guangdong (CN)

(72) Inventors: Haijun Wang, Guangdong (CN); Jiangbo Yao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/419,866

(22) PCT Filed: May 28, 2021

(86) PCT No.: PCT/CN2021/096685
§ 371 (c)(1),
(2) Date: Jun. 30, 2021

(87) PCT Pub. No.: WO2022/227175
PCT Pub. Date: Nov. 3, 2022

(65) Prior Publication Data
US 2024/0012278 A1    Jan. 11, 2024

(30) Foreign Application Priority Data
Apr. 27, 2021   (CN) .......................... 202110457569.0

(51) Int. Cl.
*G02F 1/1335* (2006.01)
(52) U.S. Cl.
CPC .. *G02F 1/133512* (2013.01); *G02F 1/133614* (2021.01)

(58) Field of Classification Search
None
See application file for complete search history.

(56) References Cited

U.S. PATENT DOCUMENTS

2011/0156184 A1   6/2011  Ninkov et al.
2020/0400986 A1*  12/2020 Yuan ................. G02F 1/133308

FOREIGN PATENT DOCUMENTS

| CN | 1963606 | | 5/2007 | |
|----|---------|---|--------|---|
| CN | 104730779 | | 6/2015 | |
| CN | 107272232 | | 10/2017 | |
| CN | 108010493 | | 5/2018 | |
| CN | 208432835 | | 1/2019 | |
| CN | 110187546 | | 8/2019 | |
| CN | 110275341 | A * | 9/2019 | ......... G02F 1/13338 |
| CN | 111539340 | | 8/2020 | |
| CN | 111752339 | | 10/2020 | |

(Continued)

*Primary Examiner* — Shan Liu

(57) ABSTRACT

A display panel and a display device are disclosed. The display panel includes drive transistors and photosensitive transistors disposed in a same layer of a first substrate. Each of the photosensitive transistors is correspondingly disposed in a gap between at least two adjacent color resist blocks. A plurality of pairs of first light-shielding support columns are disposed between the first substrate and a second substrate, a first end thereof is connected to the first substrate, and a second end thereof is connected to the second substrate. Wherein, each pair of the first light-shielding support columns is disposed corresponding to each of the photosensitive transistors by one to one.

20 Claims, 6 Drawing Sheets

(56) References Cited

FOREIGN PATENT DOCUMENTS

| | | |
|---|---|---|
| CN | 112071861 | 12/2020 |
| CN | 112083593 | 12/2020 |
| CN | 112394553 | 2/2021 |
| CN | 112420760 | 2/2021 |
| CN | 112510110 | 3/2021 |
| CN | 112612165 | 4/2021 |
| JP | 2003-149431 | 5/2003 |

* cited by examiner

DISPLAY PANEL AND DISPLAY DEVICE

RELATED APPLICATIONS

This application is a National Phase of PCT Patent Application No. PCT/CN2021/096685 having International filing date of May 28, 2021, which claims the benefit of priority of Chinese Patent Application No. 202110457569.0 filed on Apr. 27, 2021. The contents of the above applications are all incorporated by reference as if fully set forth herein in their entirety.

FIELD AND BACKGROUND OF THE INVENTION

The present disclosure relates to the field of display technologies, and more particularly, to a display panel and a display device.

Due to having characteristics of light-weightness, thinness, and small and having low power consumption, no radiation, and relatively low production cost at a same time, thin film transistor liquid crystal displays (TFT-LCDs) are widely used in flat panel display industry. In order to broaden commercial and household functions of liquid crystal displays, various functions are now integrated into the displays, such as color temperature sensing, laser sensing, gas sensing, etc., thereby increasing application scenarios of the liquid crystal displays. However, many integrated functions are in a new development stage, and there are still many processes and related designs that need to be improved for improving performances of the liquid crystal displays with various integrated functions.

FIG. 1 is a schematic structural diagram of an add-on type liquid crystal display panel in current technology.

As shown in FIG. 1, An add-on type (sensor on glass) liquid crystal display includes a first polarizer 11, a first substrate 12, a first protective layer 13, drive transistors 14, a second protective layer 15, a color resist layer 16, a black matrix 17, a third protective layer 18, first electrodes 19, support columns 20, a liquid crystal layer 21, a second electrode 22, a second substrate 23, a second polarizer 24, an adhesive layer 25, a third substrate 26, photosensitive transistors 27, and a PFA protective layer 28.

Specifically, the first substrate 12 is disposed on the first polarizer 11, the first protective layer 13 is disposed on the first substrate 12, and the drive transistors 14 are disposed on the first protective layer 13 at intervals. The second protective layer 15 covers the drive transistors 14 and the first protective layer 13, and the color resist layer 16 and the black matrix 17 are disposed on the second protective layer 15 at intervals. The third protective layer 18 is disposed on the color resist layer 16 and the black matrix 17, the first electrodes 19 are disposed on the third protective layer 18, the support columns 20 are disposed on the third protective layer 18 at intervals, and the second electrode 22 and the first electrodes 19 are disposed opposite to each other. The support columns 20 are disposed between the second electrode 22 and the first electrodes 19 and form a sealed cavity with a sealant, and the liquid crystal layer 21 is formed by filling liquid crystals in the cavity. The second substrate 23 is disposed on the second electrode 22, the second polarizer 24 is disposed on the second substrate 23, the adhesive layer 25 is disposed on the second polarizer 24, and the third substrate 26 is disposed on the adhesive layer 25. The photosensitive transistors 27 are disposed on the third substrate 26 at intervals, and the PFA protective layer 28 is disposed on the photosensitive transistors 27 and the third substrate 26. Wherein, the first electrodes 19 and the second electrode 22 are transparent ITO electrodes.

The add-on type liquid crystal display has a laser sensing effect. A main principle is that when laser irradiates on the photosensitive transistors (sensor TFTs), the photosensitive transistors will generate currents, and the currents are transmitted and converted by external signals and are finally transmitted to the drive transistors (display TFTs) of the liquid crystal display. After receiving signals, the drive transistors will generate voltages and apply the voltages to the first electrodes 19, thereby allowing the liquid crystals between the first electrodes 19 and the second electrode 22 to deflect under the voltages, and this position corresponding thereto will have bright and dark changes. The whole process is to sense and convert external laser into color changes of displays.

The add-on type liquid crystal display has a mature technique and simple processes. However, a structure of the add-on type liquid crystal display is complicated, processes thereof are more, and film layer structures thereof are more, so a transmittance of whole display is lower, and costs thereof are high, thereby limiting its application. Therefore, embedded liquid crystal display panels appear in the market.

FIG. 2 is a schematic structural diagram of an embedded liquid crystal display panel in current technology.

As shown in FIG. 2, the embedded (sensor in cell) liquid crystal display panel includes the first polarizer 11, the first substrate 12, the first protective layer 13, the drive transistors 14, the photosensitive transistors 27, the second protective layer 15, the color resist layer 16, the black matrix 17, the third protective layer 18, the first electrodes 19, the support columns 20, the liquid crystal layer 21, the second electrode 22, the second substrate 23, and the second polarizer 24.

Specifically, the first substrate 12 is disposed on the first polarizer 11, the first protective layer 13 is disposed on the first substrate 12, and the drive transistors 14 and the photosensitive transistors 27 are disposed on the first protective layer 13 at intervals. The second protective layer 15 covers the drive transistors 14 and the first protective layer 13, and the color resist layer 16 and the black matrix 17 are disposed on the second protective layer 15 at intervals. The third protective layer 18 is disposed on the color resist layer 16 and the black matrix 17, the first electrodes 19 are disposed on the third protective layer 18, the support columns 20 are disposed on the third protective layer 18 at intervals, and the second electrode 22 and the first electrodes 19 are disposed opposite to each other. The support columns 20 are disposed between the second electrode 22 and the first electrodes 19 and form the sealed cavity with the sealant, and the liquid crystal layer 21 is formed by filling the liquid crystals in the cavity. The second substrate 23 is disposed on the second electrode 22, and the second polarizer 24 is disposed on the second substrate 23.

The drive transistors 14 and the photosensitive transistors 27 of the embedded liquid crystal display panel are disposed in a same layer on the first protective layer 13, that is, the drive transistors 14 and the photosensitive transistors 27 are manufactured simultaneously. Therefore, it is not necessary to repeat a manufacturing process of thin film transistors and a bonding process, thereby saving processing costs and greatly improving the transmittance of liquid crystal display panels.

The embedded liquid crystal display panel can greatly reduce costs and improve the transmittance, but the photosensitive transistors (the sensor TFTs) are farther from a light-emitting position, that is, light (such as the laser) needs to pass more film layers (such as a polarizer (CF POL) on one side of a color filter substrate, the color filter substrate (CF glass), the liquid crystal layer, and the color resist layer) to reach the photosensitive transistors and allowing the photosensitive transistors to generate the currents. Therefore, the light needs to pass more components, thereby causing a photosensitive path of the light (the laser) to the photosensitive transistors to be longer. It will definitely weaken photosensitive intensity for the light reaching the photosensitive transistors, which may seriously cause the photosensitive transistors to fail to generate the signals under weaker laser conditions.

Technical problem: an objective of the present disclosure is to provide a display panel and a display device to solve a technical problem of the light needing to pass more components and causing a longer photosensitive path, thereby weakening the photosensitive intensity for the light reaching the photosensitive transistors.

SUMMARY OF THE INVENTION

To realize the above objective, the present disclosure provides a display panel. The display panel includes a first substrate and a second substrate disposed opposite to the first substrate; wherein, the first substrate includes: a first base substrate; a thin film transistor layer disposed on the first base substrate and including a plurality of photosensitive transistors; a color resist layer disposed on the first base substrate and including a plurality of color resist blocks arranged in an array, wherein, each of the photosensitive transistors is correspondingly disposed in a gap between at least two adjacent color resist blocks; and a plurality of pairs of first light-shielding support columns disposed between the first substrate and the second substrate, wherein, a first end of the pairs of the first light-shielding support columns is connected to the first substrate, a second end of the pairs of the first light-shielding support columns is connected to the second substrate, and each pair of the first light-shielding support columns is disposed corresponding to each of the photosensitive transistors by one to one.

Further, the first end of the pairs of the first light-shielding support columns is connected to the color resist layer, and the second end is connected to the second substrate.

Further, the second substrate is provided with a laser penetrating layer corresponding to the pairs of the first light-shielding support columns, and a photoluminescent layer is disposed on one side of the laser penetrating layer away from the second substrate.

Further, each pair of the first light-shielding support columns includes a channel extending from the first end to the second end, and an opening of one end of the channel is defined opposite to each of the photosensitive transistors.

Further, the laser penetrating layer and the photoluminescent layer are disposed in the channel formed by each pair of the first light-shielding support columns.

Further, one of the color resist blocks is disposed on each of the photosensitive transistors and in the channel formed by each pair of the first light-shielding support columns.

Further, the laser penetrating layer includes at least one of photoresists, inorganic materials, or organic materials, and the photoluminescent layer includes at least one of organic quantum dots, inorganic quantum dots, inorganic quantum mixtures, fluorescent powders, fluorescent powder mixtures, or light-emitting inks.

Further, the display panel further includes a plurality of second light-shielding support columns, wherein, the second light-shielding support columns and the pairs of the first light-shielding support columns are disposed at intervals, the second light-shielding support columns protrude from a surface of the color resist layer, and a height of the second light-shielding support columns is less than a height of the pairs of the first light-shielding support columns.

Further, the display panel further includes a plurality of third light-shielding support columns, wherein, the third light-shielding support columns and the pairs of the first light-shielding support columns are disposed at intervals, each of the third light-shielding support columns fills another gap between the at least two adjacent color resist blocks, and a top surface of the third light-shielding support columns is flush with a surface of the color resist layer.

To realize the above objective, the present disclosure further provides a display device, which includes the display panel mentioned above.

Beneficial effect: compared to current technology, the present disclosure provides the display panel and the display device. First, disposing drive transistors and the photosensitive transistors in a same layer of the first substrate, that is, the photosensitive transistors are embedded, reduces a film layer structure of the display panel, thereby obtaining an ultra-thin display panel.

Second, a stack of the laser penetrating layer and the photoluminescent layer that can emit a specific wavelength after laser irradiation is introduced on a second substrate side. The laser penetrating layer and the photoluminescent layer directly face each of the photosensitive transistors, so when the photosensitive transistors receive light-generating signals of the photoluminescent layer, an impact of an embedded structure of the photosensitive transistors can be greatly reduced and a photosensitive path of the photosensitive transistors can be shortened. Therefore, a problem of a weaker signal received by the photosensitive transistors caused by laser being absorbed by multiple film layers can be solved, thereby improving a photosensitive signal intensity of the photosensitive transistors.

At last, the display panel is provided with the pairs of the first light-shielding support columns, each pair of the first light-shielding support columns includes the channel extending from the first end of each pair of the first light-shielding support columns to the second end thereof, and the laser penetrating layer and the photoluminescent layer are disposed in the channel. When light (such as laser) irradiates the display panel, the light will pass through the laser penetrating layer and the photoluminescent layer before acting on the photosensitive transistors. In this lighting process, the laser penetrating layer allows the laser to pass but will absorb light emitted from the photoluminescent layer, which can prevent the light emitted from the photoluminescent layer from entering RGB color areas and causing a problem of color mixing.

BRIEF DESCRIPTION OF THE SEVERAL VIEWS OF THE DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

Figure 1:
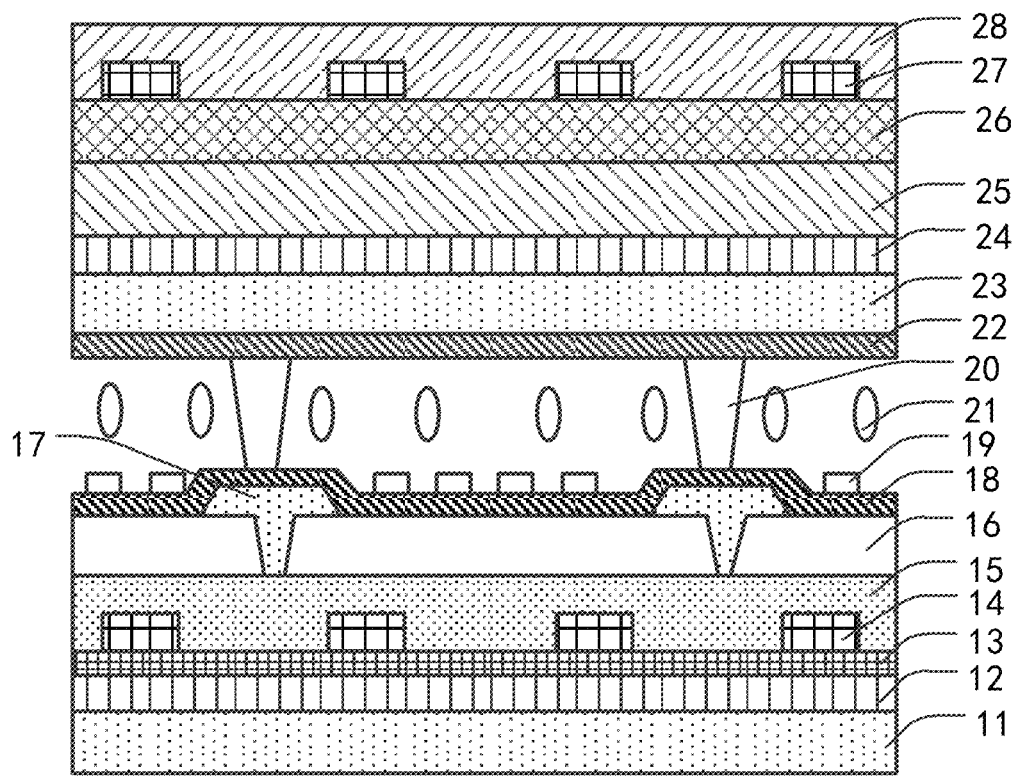
FIG. 1 is a schematic structural diagram of an add-on type liquid crystal display panel in current technology.
Figure 2:
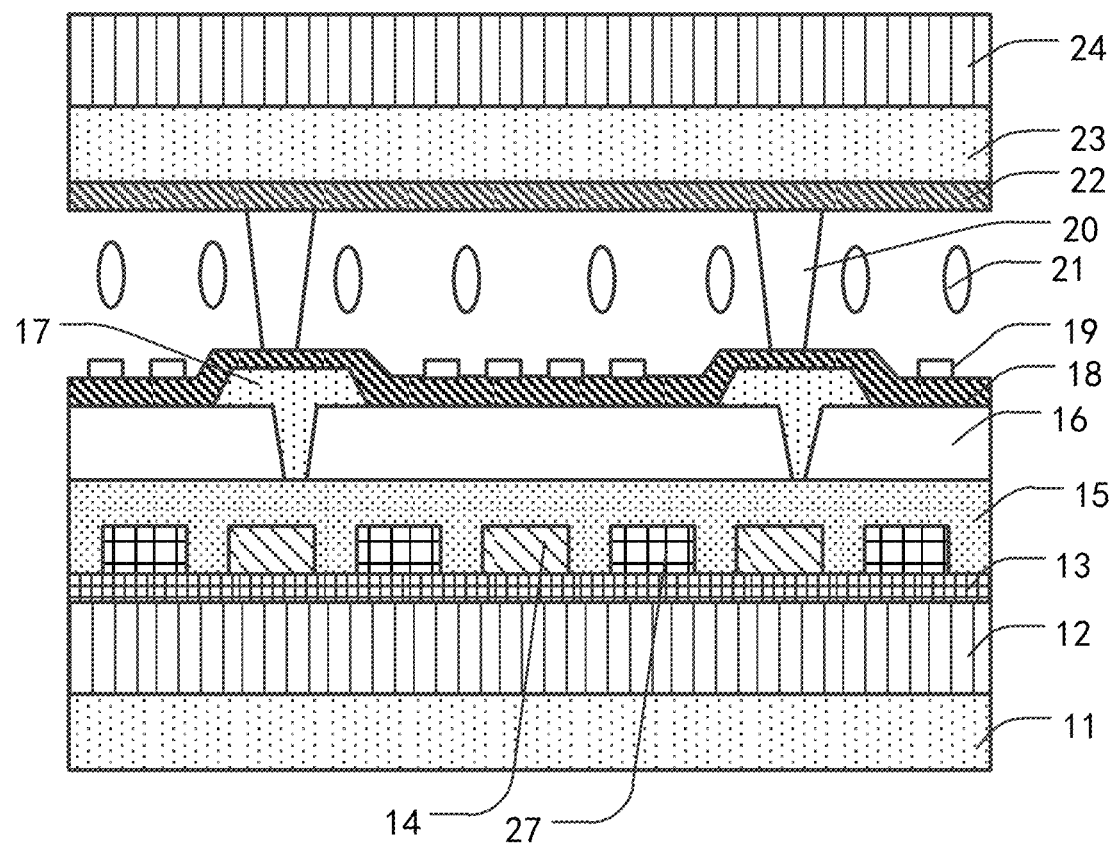
FIG. 2 is a schematic structural diagram of an embedded liquid crystal display panel in current technology.

Elements in the drawings are designated by reference numerals listed below.

1000. display panel;
1001. drive transistor;
1002. photosensitive transistor;
600. liquid crystal layer;
100. first substrate;
200. second substrate;
101. first polarizer;
102. first base substrate;
103. thin film transistor layer;
104. first protective layer;
105. color resist layer;
106. second protective layer;
107. first electrode;
105a. color resist blocks;
201. second polarizer;
202. second base substrate layer;
203. second electrode;
300. light shielding layer;
301. pair of first light-shielding support columns;
302. second light-shielding support column;
303. third light-shielding support column;
301a. column body;
301b. channel;
400. laser penetrating layer; and
500. photoluminescent layer.

DESCRIPTION OF THE SPECIFIC
EMBODIMENTS OF THE INVENTION

The technical solutions in the embodiments of the present disclosure will be clearly and completely described below with reference to the drawings in the embodiments of the present disclosure. Obviously, the described embodiments are only a part of the embodiments of the present disclosure but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure and are not used to limit the disclosure. In the present disclosure, in the case of no explanation to the contrary, the orientation words used such as "on" and "under" usually refer to upper and lower directions of the device in actual use or working state, and specifically the directions in the drawings; and "inside" and "outside" refers to the outline of the device.

An embodiment of the present disclosure provides a display panel and a display device. The display panel includes a first substrate, a second substrate disposed opposite to the first substrate, and a plurality of pairs of first light-shielding support columns disposed between the first substrate and the second substrate. The first substrate includes a first base substrate, a thin film transistor layer, and a color resist layer. The thin film transistor layer is disposed on the first base substrate and includes a plurality of photosensitive transistors. The color resist layer is disposed on the first base substrate and includes a plurality of color resist blocks arranged in an array. Each of the photosensitive transistors is correspondingly disposed in a gap between at least two adjacent color resist blocks, that is, the photosensitive transistors are embedded in the display panel (sensor TFTs in cell). A first end of the pairs of the first light-shielding support columns is connected to the first substrate, and a second end of the pairs of the first light-shielding support columns is connected to the second substrate. Wherein, the pairs of the first light-shielding support columns are disposed corresponding to the photosensitive transistors by one to one, so a problem of embedded photosensitive transistors having a weaker photosensitivity and generating a weaker signal can be solved. A detailed description will be given below with embodiments.

Embodiment 1

Figure 3:
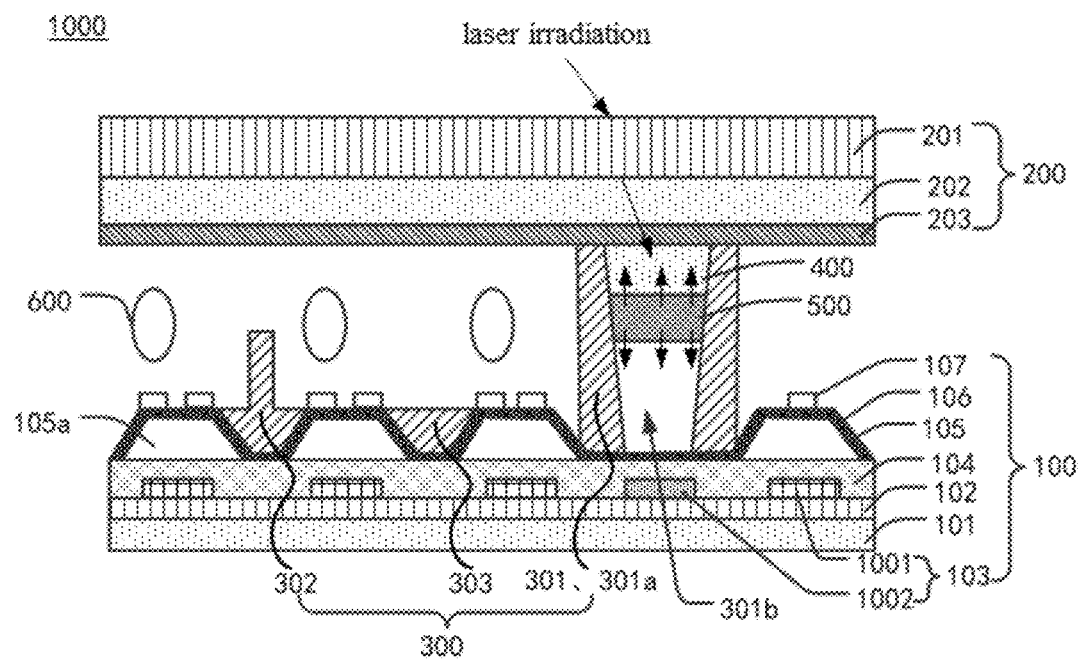
FIG. 3 is a schematic structural diagram of a display panel according to embodiment 1 of the present disclosure.

FIG. 3 is a schematic structural diagram of the display panel according to this embodiment of the present disclosure.

This embodiment provides the display panel 1000, which is a liquid crystal display panel. The display panel includes the first substrate 100 and the second substrate 200. Wherein, the first substrate 100 and the second substrate 200 are disposed opposite to each other.

Specifically, the first substrate 100 includes a first polarizer 101, the first base substrate 102, the thin film transistor layer 103, a first protective layer 104, the color resist layer 105, a second protective layer 106, and first electrodes 107.

The first polarizer 101 includes a polarizing film, a protective film disposed on one side of the polarizing film, and a release film disposed on another side of the polarizing film.

The first base substrate 102 is disposed on the first polarizer 101. The first base substrate 102 may be a flexible substrate or a rigid substrate, which is not particularly limited here.

The thin film transistor layer 103 is disposed on the first base substrate 102 and includes drive transistors 1001 and the photosensitive transistors 1002 disposed in a same layer. Wherein, the drive transistors 1001 are configured to output driving currents to light-emitting units according to driving voltages, so the light-emitting unit can emit light under an effect of the driving currents. The photosensitive transistors 1002 may be used to absorb wavelengths of light and generate signals to realize laser sensing.

In order to improve performances of the thin film transistor layer 103 for blocking water and oxygen, the first protective layer 104 is further disposed on an upper surface of the thin film transistor layer 103 in this embodiment. The first protective layer 104 covers surfaces of the drive transistors 1001 and the photosensitive transistors 1002 and fills gaps among the drive transistors 1001 and the photosensitive transistors 1002. Wherein, a material of the first protective layer 104 may be silicon oxide, silicon nitride, etc.

The color resist layer 105 is disposed on the thin film transistor layer 103. Specifically, the color resist layer 105 is disposed on the first protective layer 104 and includes the plurality of color resist blocks 105a arranged in the array. Wherein, each of the photosensitive transistors 1002 is correspondingly disposed in the gap between the at least two adjacent color resist blocks 105a. The color resist blocks 105a include red color resist blocks, green color resist blocks, and blue color resist blocks, so the display panel 1000 has a plurality of RGB color areas.

In order to improve performances of the color resist layer 105 for blocking water and oxygen, the second protective layer 106 is further disposed on an upper surface of the color resist layer 105 in this embodiment. The second protective layer 106 covers the color resist blocks 105a, which extends from an upper surface of one of the color resist blocks 105a to a surface of the gap between the one and another one of the color resist blocks 105a adjacent thereto. Wherein, a material of the second protective layer 106 may be silicon oxide, silicon nitride, etc.

The first electrodes 107 are disposed on an upper surface of the second protective layer 106, and a projection of the first electrodes 107 on the first base substrate 102 is within a projection of the color resist blocks 105a on the first base substrate 102. A material used by the first electrodes 107 includes, but is not limited to, ITO.

Referring to FIG. 3, the second substrate 200 includes a second polarizer 201, a second base substrate 202, and a second electrode 203.

The second polarizer 201 includes the polarizing film, the protective film disposed on the side of the polarizing film, and the release film disposed on the another side of the polarizing film.

The second base substrate 202 is disposed on one side surface of the second polarizer 201 adjacent to the first substrate 100. The second base substrate 202 may be the flexible substrate or the rigid substrate, which is not particularly limited here.

The second electrode 203 is disposed on one side surface of the second substrate 202 adjacent to the first substrate 100. A material used by the second electrode 203 includes, but is not limited to, ITO.

Referring to FIG. 3, the display panel 1000 further includes a light shielding layer 300, a laser penetrating layer 400, and a photoluminescent layer 500. Wherein, the light shielding layer 300 includes the pairs of first light-shielding support columns 301, second light-shielding support columns 302, and third light-shielding support columns 303. In this embodiment, a material of the light shielding layer 300 includes, but is not limited to, black matrices, as long as the material can play a role of black blocking effects. The second substrate 200 is provided with the laser penetrating layer 400 corresponding to the pairs of the first light-shielding support columns 301, and the photoluminescent layer 500 is disposed on one side surface of the laser penetrating layer 400 away from the second substrate 200.

Specifically, the first end of the pairs of the first light-shielding support columns 301 is connected to the first substrate 100, the second end of the pairs of the first light-shielding support columns 301 is connected to the second substrate 200, and each pair of the first light-shielding support columns 301 is disposed corresponding to each of the photosensitive transistors by one to one. Specifically, the first end of the pairs of the first light-shielding support columns 301 is connected to the color resist layer 105 or the second protective layer 106, and the second end is connected to the second electrode 203 of the second substrate 200. Each pair of the first light-shielding support columns 301 includes a pair of column bodies 301a and a channel 301b formed by the first end of the column bodies 301a extending to the second end of the column bodies 301a, and an opening of one end of the channel 301b is defined opposite to each of the photosensitive transistors 1002.

The laser penetrating layer 400 and the photoluminescent layer 500 are disposed in the channel 301b formed by each pair of the first light-shielding support columns 301, and are positioned on top of the channel 301b. Specifically, the laser penetrating layer 400 is disposed on a lower surface of the second electrode 203, and the photoluminescent layer 500 is disposed on a lower surface of the laser penetrating layer 400.

In this embodiment, the laser penetrating layer 400 may be a single layered film or a multi-layered film, and a thickness of the single layered film ranges from 2 nm to 20 um. A material of the laser penetrating layer 400 includes at least one of photoresists, inorganic materials, or organic materials, but is not limited to these materials, as long as the material can match laser wavelengths and has low laser absorption, thereby being beneficial to transmitting laser.

In this embodiment, a thickness of the photoluminescent layer 500 ranges from 2 nm to 20 um, and a material of the photoluminescent layer 500 includes one of organic quantum dots, inorganic quantum dots, inorganic quantum mixtures, fluorescent powders, fluorescent powder mixtures, or light-emitting inks. The material of the photoluminescent layer 500 is mainly determined according to conditions when the photosensitive transistors 1002 (sensor TFTs) have a highest photogenerated current efficiency. For example, if the photosensitive transistors 1002 have the highest photogenerated current efficiency when receiving light irradiation having wavelengths ranging from 500 nm to 550 nm, then the photoluminescent layer 500 is required to generate light having the wavelengths ranging from 500 nm to 550 nm when laser irradiation.

The second light-shielding support columns 302 and the pairs of the first light-shielding support columns 301 are disposed at intervals, and each of the second light-shielding support columns is disposed in another gap between the at least two adjacent color resist blocks 105a. Wherein, the second light-shielding support columns 302 protrude from the upper surface of the color resist layer 105, and a height of the second light-shielding support columns 302 is less than a height of the pairs of the first light-shielding support columns 301.

The third light-shielding support columns 303 and the pairs of the first light-shielding support columns 301 are disposed at intervals, wherein, each of the third light-shielding support columns 303 fills yet another gap between the at least two adjacent color resist blocks 105a, and a top surface of the third light-shielding support columns 303 is flush with a surface of the color resist layer 105.

In this embodiment, the light shielding layer 300 may be manufactured using a photomask having different transmittances to allow a height of the third light-shielding support columns 303 to be less than the height of the second light-shielding support columns 302 and the height of the second light-shielding support columns 302 to be less than the height of the pairs of the first light-shielding support columns 301. Wherein, the height of the pairs of the first light-shielding support columns 301 ranges from 0 to 10 um, the height of the second light-shielding support columns 302 ranges from 0 to 5 um, and the height of the third light-shielding support columns 303 ranges from 0.1 um to 5 um.

Figure 4:
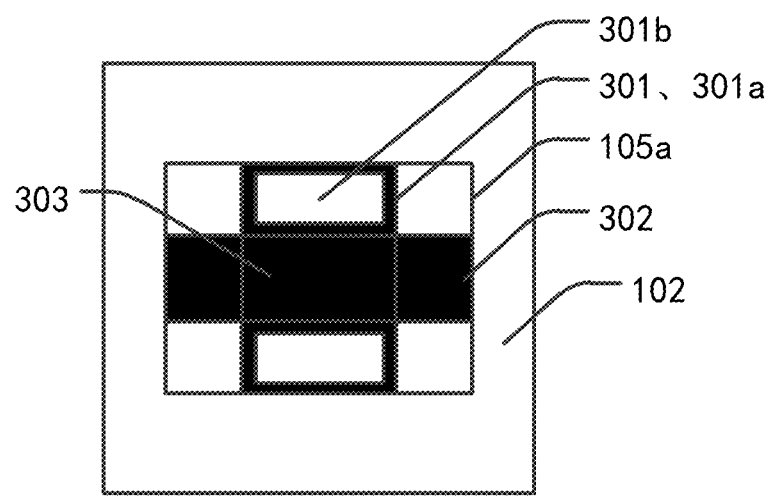
FIG. 4 is a schematic planar diagram of each pair of first light-shielding support columns disposed in a gap between two adjacent color resist blocks according to embodiment 1 of the present disclosure.

FIG. 4 is a schematic planar diagram of each pair of first light-shielding support columns disposed in a gap between two adjacent color resist blocks according to this embodiment of the present disclosure.

As shown in FIG. 4, when each pair of the first light-shielding support columns 301 is disposed in the gap between the at least two adjacent color resist blocks 105a, each pair of the first light-shielding support columns 301 is only disposed in the gap between the two adjacent color resist blocks 105a, and each of the second light-shielding support columns 302 is disposed in the another gap between the at least two adjacent color resist blocks 105a.

In this embodiment, when the laser enters the laser penetrating layer 400 from an upper surface of the display panel 1000, the laser penetrating layer 400 has a laser penetrating ability and a light absorbing ability, which allow the laser to pass but absorb light emitted from the photoluminescent layer 500, thereby preventing the light emitted from the photoluminescent layer 500 from causing color mixing on the color resist layer 105. The photoluminescent layer 500 will generate the light having a corresponding wavelength when the laser irradiates on it. This wavelength can be absorbed by the photosensitive transistors 1002 (the sensor TFTs) to generate signals, so the laser does not need to pass through multiple film layers of the display panel 1000 to allow the photosensitive transistors 1002 to generate the signals, thereby greatly improving a laser induction intensity. It should be noted that arrows indicating from the laser penetrating layer 400 to the photoluminescent layer 500 means a direction that the laser penetrating layer 400 allows the laser to pass, and another arrows indicating from the photoluminescent layer 500 to the laser penetrating layer 400 means that the laser penetrating layer 400 absorbs the light emitted from the photoluminescent layer 500.

In this embodiment, the display panel 1000 further includes a liquid crystal layer 600 disposed between the first substrate 100 and the second substrate 200, and liquid crystals of the liquid crystal layer fill an area excluding the channel 301b. Wherein, the pairs of the first light-shielding support columns 301 and the second light-shielding support columns 302 are configured to support the first substrate 100 and the second substrate 200, which play a role of supporting a cell thickness of liquid crystal displays. Meanwhile, the pairs of the first light-shielding support columns 301 also plays a role of preventing the light emitted from the photoluminescent layer 500 from entering the RGB color areas and causing color mixing.

This embodiment provides the display panel 1000. First, disposing the drive transistors 1001 and the photosensitive transistors 1002 in the same layer of the first substrate 100, that is, the photosensitive transistors 1002 are embedded (sensor TFTs in cell), reduces a film layer structure of the display panel 1000, thereby obtaining an ultra-thin display panel.

Second, a stack of the laser penetrating layer 400 and the photoluminescent layer 500 that can emit a specific wavelength after laser irradiation is introduced on a second substrate 200 side. The laser penetrating layer 400 and the photoluminescent layer 500 directly face each of the photosensitive transistors 1002, so when the photosensitive transistors 1002 receive light-generating signals of the photoluminescent layer 500, an impact of an embedded structure of the photosensitive transistors (the sensor TFTs in cell) can be greatly reduced, and the photosensitive path of the photosensitive transistors 1002 can be shortened. Therefore, a problem of a weaker signal received by the sensor TFTs caused by the laser being absorbed by the multiple film layers can be solved, thereby improving a photosensitive signal intensity of the photosensitive transistors 1002.

At last, the display panel 1000 is provided with the pairs of the first light-shielding support columns 301, each pair of the first light-shielding support columns 301 includes the channel 301b extending from the first end of each pair of the first light-shielding support columns 301 to the second end of each pair of the first light-shielding support columns 301, and the laser penetrating layer 400 and the photoluminescent layer 500 are disposed in the channel 301b. When the light (such as the laser) irradiates the display panel 1000, the light will pass through the laser penetrating layer 400 and the photoluminescent layer 500 before acting on the photosensitive transistors 1002. In this lighting process, the laser penetrating layer 400 allows the laser to pass but will absorb the light emitted from the photoluminescent layer 500, which can prevent the light emitted from the photoluminescent layer 500 from entering the RGB color areas and causing the problem of color mixing.

This embodiment further provides the display device, which includes the display panel mentioned above. The display device may be any product or component having a display function, such as an electronic paper, a mobile phone, a tablet computer, a television, a monitor, a notebook computer, a digital photo frame, a navigator, etc.

Embodiment 2

This embodiment provides the display panel and the display device, which include most technical solutions of embodiment 1. A difference is that each pair of the first light-shielding support columns is disposed in a gap among multiple adjacent color resist blocks.

Figure 5:
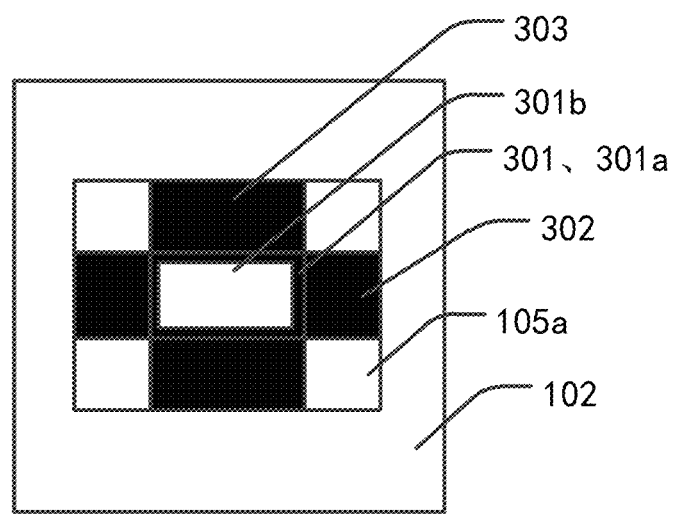
FIG. 5 is a schematic planar diagram of each pair of first light-shielding support columns disposed in a gap among multiple adjacent color resist blocks according to embodiment 2 of the present disclosure.

FIG. 5 is a schematic planar diagram of each pair of first light-shielding support columns disposed in the gap among the multiple adjacent color resist blocks according to this embodiment of the present disclosure.

Specifically, as shown in FIG. 5, when each pair of the first light-shielding support columns 301 is disposed in the gap between the at least two adjacent color resist blocks 105a, each pair of the first light-shielding support columns 301 is disposed in the gap among the multiple adjacent color resist blocks 105a.

Embodiment 3

This embodiment provides the display panel and the display device, which include the most technical solutions of embodiment 1. A difference is that each pair of the first light-shielding support columns is disposed on the color resist blocks adjacent thereto and in a gap among the color resist blocks adjacent thereto.

Figure 6:
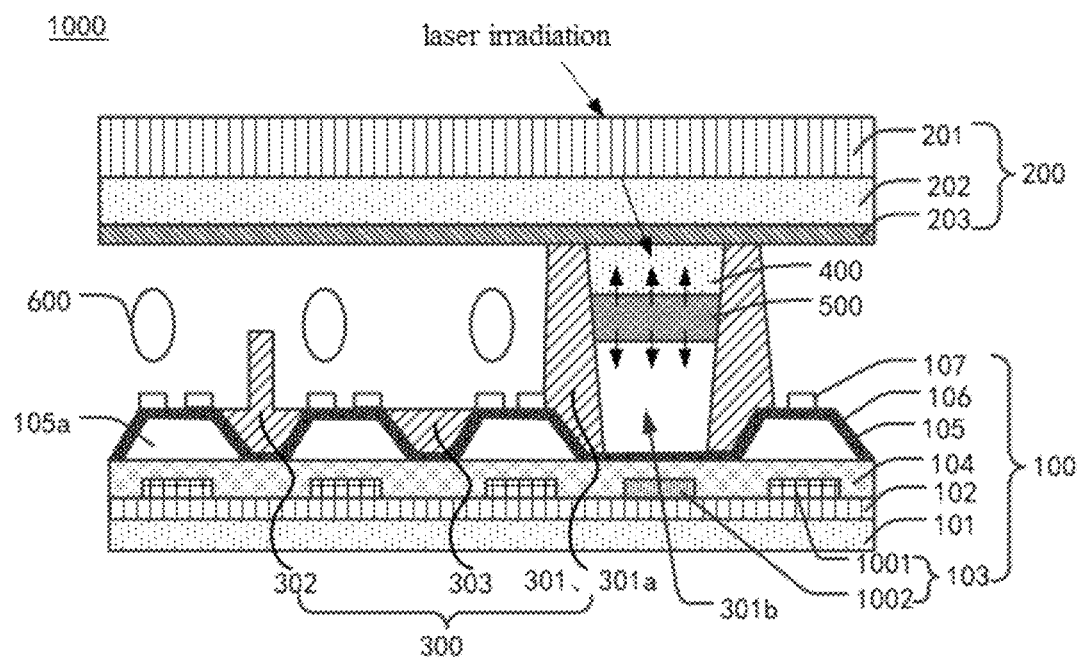
FIG. 6 is a schematic structural diagram of the display panel according to embodiment 3 of the present disclosure.
Figure 7:
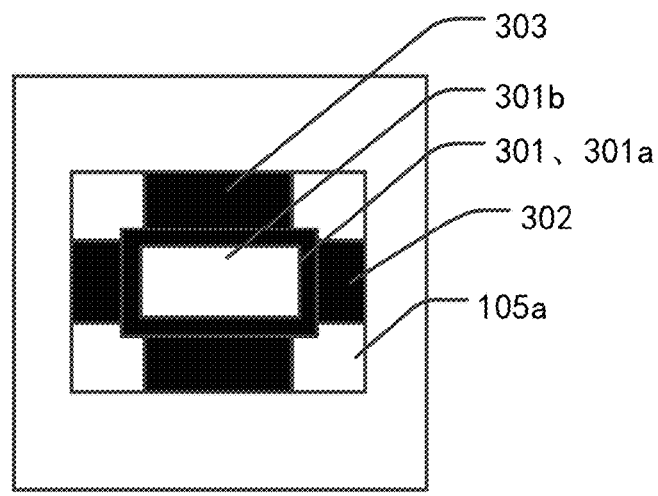
FIG. 7 is a schematic planar diagram of each pair of first light-shielding support columns disposed on color resist blocks adjacent thereto and in a gap among the color resist blocks according to embodiment 3 of the present disclosure.
Figure 8:
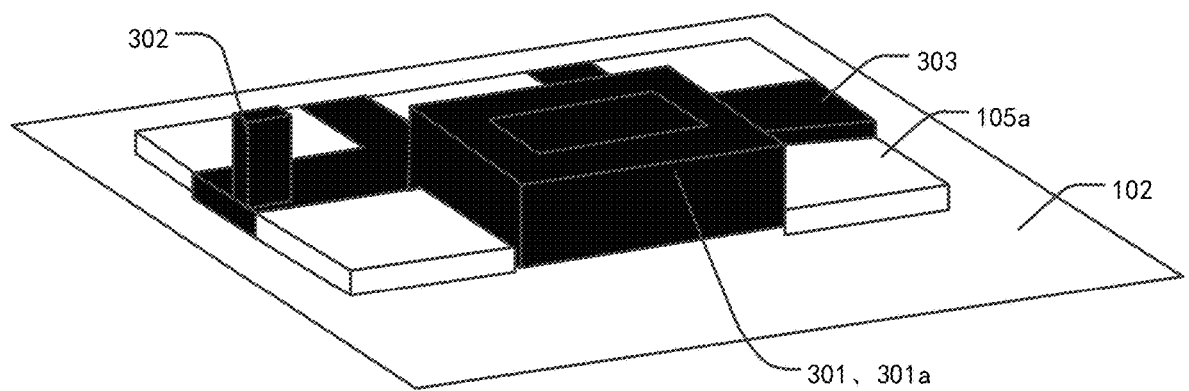
FIG. 8 is a schematic stereograph of each pair of first light-shielding support columns disposed in the gap among the multiple adjacent color resist blocks according to embodiment 3 of the present disclosure.

FIG. 6 is a schematic structural diagram of the display panel according to this embodiment. FIG. 7 is a schematic planar diagram of each pair of the first light-shielding support columns disposed on the color resist blocks adjacent thereto and in the gap among the color resist blocks adjacent thereto according to this embodiment. FIG. 8 is a schematic stereograph of each pair of the first light-shielding support columns disposed in the gap among the multiple adjacent color resist blocks according to this embodiment.

Specifically, as shown in FIGS. 6 to 8, when each pair of the first light-shielding support columns 301 is disposed in the gap between the at least two adjacent color resist blocks 105a, each pair of the first light-shielding support columns

301 extends from the gap among the color resist blocks 105a adjacent to the pair of the first light-shielding support columns 301 to edges of the multiple color resist blocks 105a adjacent thereto.

Embodiment 4

This embodiment provides the display panel and the display device, which include the most technical solutions of embodiment 1, 2, or 3. A difference is that one of the color resist blocks is disposed on each of the photosensitive transistors and in the channel formed by each pair of the first light-shielding support columns.

Figure 9:
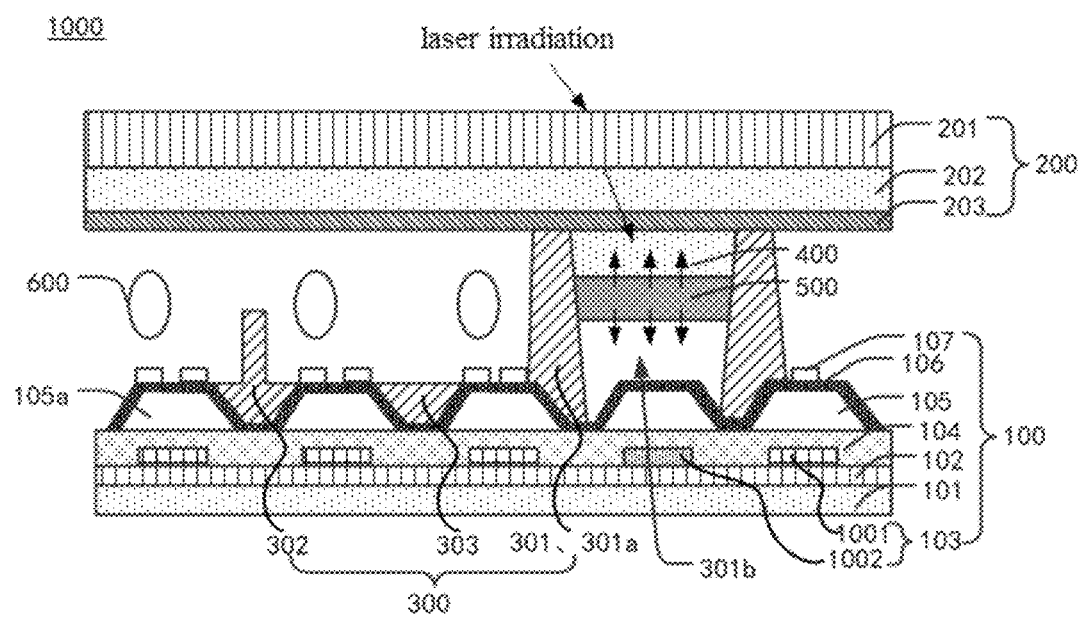
FIG. 9 is a schematic structural diagram of the display panel according to embodiment 4 of the present disclosure.

FIG. 9 is a schematic structural diagram of the display panel according to this embodiment.

As shown in FIG. 9, this embodiment is based on the technical solutions of embodiment 3. A difference is that one of the color resist blocks is disposed on each of the photosensitive transistors 1002 and in the channel 301b formed by each pair of the first light-shielding support columns 301.

When the color resist block 105a in the channel 301b is a red color resist block, the photosensitive transistors 1002 have significant sensitivity to red light having a wavelength ranging from 720 nm to 750 nm. When an external laser of 200 nm irradiates on the photoluminescent layer 500 which can emit light having a wavelength ranging from 500 nm to 770 nm (a waveband of green light to red light), the photoluminescent layer 500 will irradiate the light having the wavelength ranging from 500 nm to 770 nm on the red color resist block, then the green light will be absorbed by the red color resist block, and the red light will not be absorbed by the red color resist block and will irradiate on the photosensitive transistors 1002, thereby further improving sensing accuracy of the photosensitive transistors 1002. Similarly, when the color resist block 105a in the channel 301b is a green color resist block or a blue color resist block, it can also filter the light passing through the channel 301b according to the above method.

The liquid crystal display panel and the display device provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A display panel, comprising a first substrate and a second substrate disposed opposite to the first substrate;
    wherein the first substrate comprises:
    a first base substrate;
    a thin film transistor layer disposed on the first base substrate and comprising a photosensitive transistor;
    a color resist layer disposed on the first base substrate and comprising a plurality of color resist blocks arranged in an array, wherein the photosensitive transistor is disposed in a gap between at least two adjacent ones of the color resist blocks; and
    a pair of first light-shielding support columns disposed between the first substrate and the second substrate, wherein a first end of the pair of the first light-shielding support columns is connected to the first substrate, a second end of the pair of the first light-shielding support columns is connected to the second substrate, and the pair of the first light-shielding support columns is disposed opposite to the photosensitive transistor; and
    wherein a laser penetrating layer and a photoluminescent layer that correspond to the pair of the first light-shielding support columns are disposed on the second substrate, and the photoluminescent layer is disposed on a side of the laser penetrating layer away from the second substrate.

2. The display panel according to claim 1, wherein the first end is connected to the color resist layer.

3. The display panel according to claim 1, wherein the pair of the first light-shielding support columns forms a channel extending from the first end to the second end, and the channel has an opening at an end opposite to the photosensitive transistor.

4. The display panel according to claim 3, wherein the laser penetrating layer and the photoluminescent layer are disposed in the channel.

5. The display panel according to claim 3, wherein one of the color resist blocks is disposed on the photosensitive transistor and in the channel.

6. The display panel according to claim 1, wherein the laser penetrating layer comprises at least one of photoresists, inorganic materials, or organic materials, and the photoluminescent layer comprises at least one of organic quantum dots, inorganic quantum dots, inorganic quantum mixtures, fluorescent powders, fluorescent powder mixtures, or light-emitting inks.

7. The display panel according to claim 1, wherein a height of the pair of the first light-shielding support columns is less than or equal to 10 μm; and
    a thickness of the photoluminescent layer ranges from 2 nm to 20 μm.

8. The display panel according to claim 1, further comprising a plurality of second light-shielding support column spaced apart from the pair of the first light-shielding support columns, wherein the second light-shielding support column protrudes from a surface of the color resist layer, and a height of the second light-shielding support column is less than a height of the pair of the first light-shielding support columns.

9. The display panel according to claim 8, wherein the height of the second light-shielding support column is less than or equal to 5 μm.

10. The display panel according to claim 8, further comprising a third light-shielding support column spaced apart from the pair of the first light-shielding support columns, wherein the third light-shielding support column fills another gap between at least two adjacent ones of the color resist blocks, and a top surface of the third light-shielding support column is flush with the surface of the color resist layer.

11. The display panel according to claim 10, wherein a height of the pair of the first light-shielding support columns is less than or equal to 10 μm; and
    a height of the third light-shielding support column ranges from 0.1 μm to 5 μm.

12. A display device, comprising the display panel according to claim 1.

13. The display device according to claim 12, wherein the first end is connected to the color resist layer.

14. The display device according to claim 12, wherein the pair of the first light-shielding support columns forms a channel extending from the first end to the second end, and the channel has an opening at an end opposite to the photosensitive transistor.

15. The display device according to claim 14, wherein the laser penetrating layer and the photoluminescent layer are disposed in the channel.

16. The display device according to claim 12, wherein the laser penetrating layer comprises at least one of photoresists, inorganic materials, or organic materials, and the photoluminescent layer comprises at least one of organic quantum dots, inorganic quantum dots, inorganic quantum mixtures, fluorescent powders, fluorescent powder mixtures, or light-emitting inks.

17. The display device according to claim 12, further comprising a second light-shielding support column spaced apart from the pair of the first light-shielding support columns, wherein the second light-shielding support column protrudes from a surface of the color resist layer, and a height of the second light-shielding support column is less than a height of the pair of the first light-shielding support columns.

18. The display device according to claim 17, further comprising a third light-shielding support column spaced apart from the pair of the first light-shielding support columns, wherein the third light-shielding support column fills another gap between at least two adjacent ones of the color resist blocks, and a top surface of the third light-shielding support column is flush with the surface of the color resist layer.

19. A display panel, comprising a first substrate and a second substrate disposed opposite to the first substrate;

wherein the first substrate comprises:

a first base substrate;

a thin film transistor layer disposed on the first base substrate and comprising a photosensitive transistor;

a color resist layer disposed on the first base substrate and comprising a plurality of color resist blocks arranged in an array, wherein the photosensitive transistor is disposed in a gap between at least two adjacent ones of the color resist blocks;

a pair of first light-shielding support columns disposed between the first substrate and the second substrate, wherein a first end of the pair of the first light-shielding support columns is connected to the first substrate, a second end of the pair of the first light-shielding support columns is connected to the second substrate, and the pair of the first light-shielding support columns is disposed opposite to the photosensitive transistor; and a second light-shielding support column spaced apart from the pair of the first light-shielding support columns, wherein the second light-shielding support column protrudes—from a surface of the color resist layer, and a height of the second light-shielding support column is less than a height of the pair of the first light-shielding support columns.

20. The display panel according to claim 19, wherein the height of the second light-shielding support column is less than or equal to 5 µm.

* * * * *